United States Patent
Rundt

[15] 3,704,498
[45] Dec. 5, 1972

[54] METHOD OF WELDING BEARING COMPONENTS

[72] Inventor: John W. Rundt, Dellroy, Ohio

[73] Assignee: The Timken Company, Canton, Ohio

[22] Filed: July 26, 1971

[21] Appl. No.: 165,927

Related U.S. Application Data

[63] Continuation-in-part of Ser. No. 85,085, Oct. 29, 1970, abandoned.

[52] U.S. Cl. ............... 29/148.4 A, 29/446, 308/214
[51] Int. Cl. .................. B23p 11/00, B23p 11/02
[58] Field of Search..308/214, 174; 29/148.4 A, 446, 29/475, 148.4 R, 149.5, 475, 470, 148.4 D

[56] References Cited

UNITED STATES PATENTS

| | | |
|---|---|---|
| 881,471 | 3/1908 | Hoffman..........................29/148.4 A |
| 1,132,052 | 3/1915 | Wattmann..............................29/446 |
| 1,911,336 | 5/1953 | Ackerman.......................29/148.4 A |
| 3,420,589 | 1/1969 | Green et al..........................308/174 |

Primary Examiner—Thomas H. Eager
Attorney—Gravely, Lieder & Woodruff

[57] ABSTRACT

A thrust rib is welded to a bearing race by positioning the rib around one end of the race and then applying an outwardly directed force to the race. The force expands both the race and rib so as to pre-stress them. While the rib and race are pre-stressed they are welded together. The magnitude of the pre-stress is approximately equal to the amount of stress induced in the weld metal as that metal solidifies and cools so that when the pre-stress is released the race and rib shrink to their initial size and the metal of the weld area becomes substantially free of stress.

14 Claims, 4 Drawing Figures

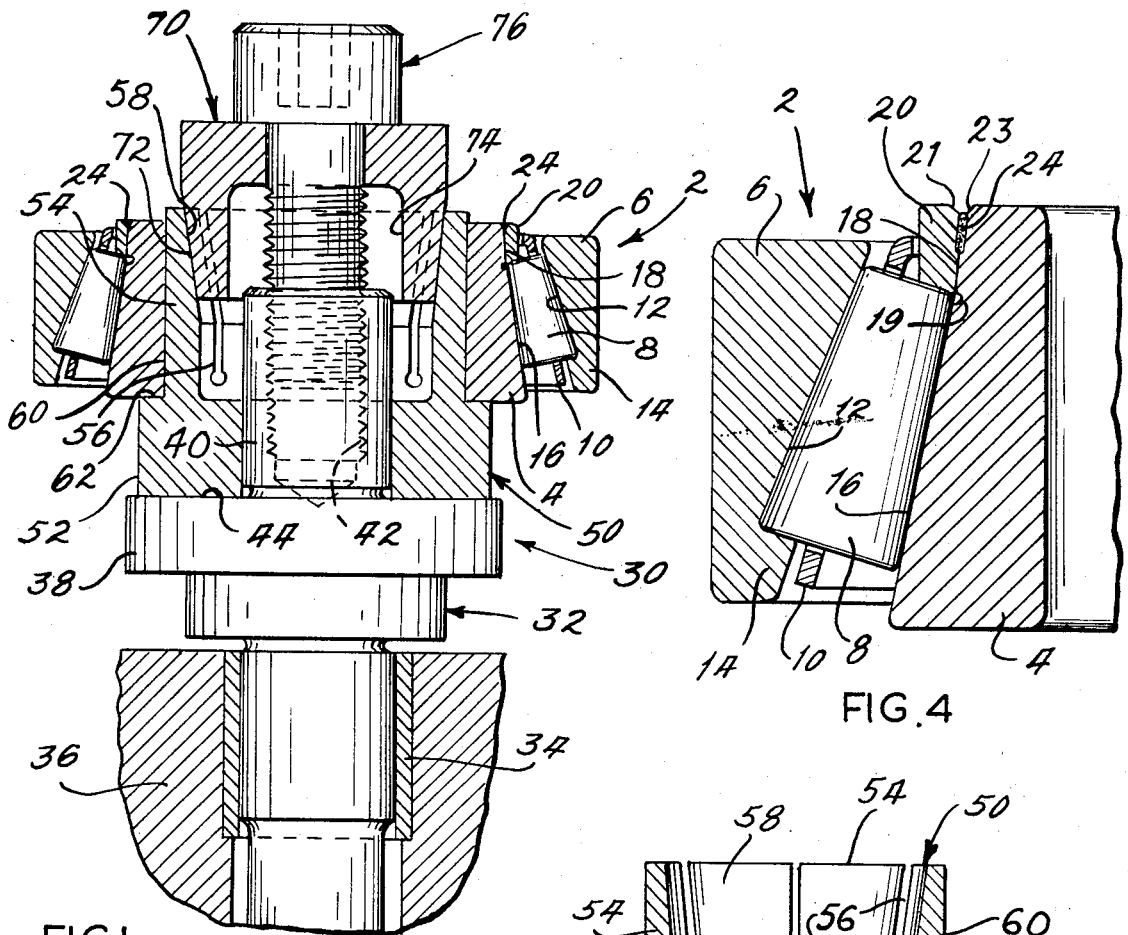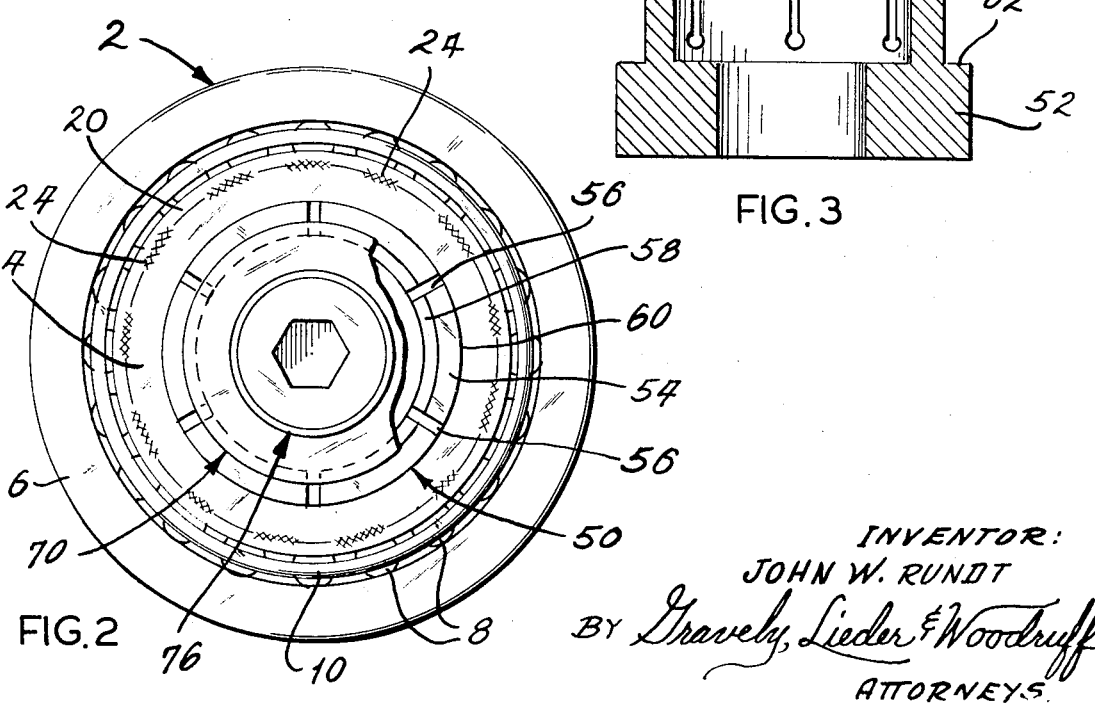

METHOD OF WELDING BEARING COMPONENTS

This application is a continuation-in-part of the copending application of John W. Rundt, Ser. No. 85,085, filed Oct. 29, 1970, now abandoned.

BACKGROUND OF THE INVENTION

This invention relates in general to welding and more particularly to a method of welding bearing components and a unitized bearing formed by the method.

While single row tapered roller bearings are normally supplied as two separable components, namely a cup and a cone against which the rollers are held by an encircling cage, in some applications it is desirable to have the bearing unitized, it is, furnished as a single or inseparable unit. One advantage of unitized tapered roller bearings is that they reduce the number of loose or free bearing parts and consequently facilitate assembly of the overall journal construction. More important, however, unitized single row bearings accept thrust loads in each axial direction, whereas conventional single row tapered roller bearings have the capability of accommodating thrust loads only in the direction which seats the tapered rollers against the raceways of the cup and cone. Accordingly, a single row unitized bearing can take the place of two conventional single row bearings mounted in opposition or a conventional single row bearing utilized in conjunction with some other thrust absorbing device.

The conventional practice for unitizing a single row tapered roller bearing involves extending one thrust rib inwardly from the large diameter end of the cup and another thrust rib outwardly from the small diameter end of the cone. The cup thrust rib of course projects partially across the large diameter end faces of the rollers, whereas the cone thrust rib projects partially across the small diameter end faces of the rollers. Thus, the rollers are captured between the two thrust ribs and cannot be displaced from the bearing either axially or radially. Likewise, the rollers position the cup axially with respect to the cone so that the bearing is truly unitized.

In order to assemble the bearing, that is to fit the rollers and the cage in which they are contained between the opposed raceways of the cup and cone, one of the thrust ribs must be detached during the assembly operation and thereafter secured to or against the cup or cone whatever the case may be. Heretofore, several ways have been devised for securing a bearing thrust rib to a cup or cone in a single row tapered roller bearing. In this connection, see U.S. Pat. No. 3,420,589 issued to W. F. Green, et al., on Jan. 7, 1969.

Perhaps the most secure method of joining an initially detached thrust rib to a bearing cone or cup is by welding, but welding involves melting and fusing the metal of the parts joined thereby. As the metal in the weld area solidifies and thereafter cools still further, it tends to shrink or contract. By reason of the fact that such bearing welds are normally circular to conform to the shape of the parts they join together, they tend to contract those parts. Moreover, the portions of the parts away from the weld area tend to resist the contraction of the weld area, and as a result the metal adjacent the weld area is placed in compression, while extreme tensile stresses are introduced into the metal of the weld area.

Moreover, since the mass of metal which is actually melted is quite small in comparison to the mass of the parts joined by the weld, the molten metal cools rapidly and in effect amounts to a drastic quenching of the high carbon steel of the parts. This leaves the weld area in an extremely hard and brittle condition, which in turn makes it extremely vulnerable to cracking in the presence of stress. Such stress is indeed present in the form of internal or locked in stresses as previously noted. Cracks which originate in the weld area propagate away from it into the adjoining bearing metal when that metal is subjected to fatigue stress or shocks as it always is during the operation of the bearing. On the other hand, the brittleness and hardness cannot be removed by conventional tempering or drawing operations for to do so would soften other areas of the bearing part and leave it unsuitable for bearing uses.

Thus, when a bearing cone or cup to which a thrust rib has been attached by a circumferentially extending weld is placed in service, the additional stresses set up from the load cause the bearing to fail due to cracking much sooner than comparative bearing parts which have not been welded.

Moreover, the contraction of the weld area during cooling tends to distort the entire bearing and this of course changes the diameter and the raceway taper of the welded component, often bringing them outside critical tolerances.

SUMMARY OF THE INVENTION

One of the principal objects of the present invention is to provide a method for welding bearing components without inducing extreme localized stresses into the welded components upon solidification and cooling of the weld. Another object is to provide a process for assembling and unitizing a bearing by joining initially detached components through welding. A further object is to provide a unitized bearing in which the thrust rib is welded to one of the races. An additional object is to provide a process of the type stated which is simple and economical to perform. Still another object is to provide a process of the type stated which does not require complex and expensive welding fixtures. These and other objects and advantages will become apparent hereinafter.

The present invention is embodied in a process for welding bearing components by first expanding the bearing components and then welding them while they are expanded. The invention in addition includes a unitized bearing formed by the process. The invention also resides in the parts and in the arrangements and combinations of parts hereinafter described and claimed.

DESCRIPTION OF THE DRAWINGS

In the accompanying drawings which form part of the specification and wherein like numerals refer to like parts wherever they occur:

FIG. 1 is a sectional view of a unitized tapered roller bearing positioned on a welding fixture constructed for implementing the process of the present invention;

FIG. 2 is an end or plan view of the welding fixture with the bearing positioned thereon;

FIG. 3 is a transverse sectional view of an arbor forming part of the welding fixture; and FIG. 4 is a fragmentary sectional view of the bearing formed by the process.

DETAILED DESCRIPTION

Referring now in detail to the drawings, 2 designates a unitized single row tapered roller bearing which has initially detachable components or segments welded together to unitize the bearing. The welding is made in accordance with the process of the present invention, and by reason of this fact does not induce high stress concentrations in the bearing nor does it distort the shape of the bearing.

Broadly speaking, the bearing 2 includes a cone 4, a cup 6, a plurality of tapered rollers 8, and a cage 10. The cup 6 has an inwardly presented tapered raceway 12, and at the large diameter end of that raceway it is provided with an inwardly projecting thrust rib 14 which forms an integral part thereof. The cone 4 has an external tapered raceway 16 which is presented opposite to the raceway 12 of the cup 6, and beyond the small diameter end of the raceway 16 the cone 4 is further provided with a slightly tapered end surface 18 which tapers in the same direction as the raceway 16. The tapered end surface 18 and the tapered raceway 16 are separated by a groove or undercut 19 which is machined into the cone 4.

The cone 4 is further provided with a thrust rib 20 which embraces the slightly tapered end surface 18 and hence projects radially outwardly beyond the cone raceway 16 and the undercut 19. The rib 20 is not formed integral with the cone 4, but on the contrary is formed as a separate component which is later joined to the cone 4. The thrust rib 20 possesses a ring-like configuration, and at its corner located adjacent to the end face of the cone 4 it is provided with a chamfer 21.

The tapered rollers 8 fit between the cone 4 and the cup 6 and roll along the opposed raceways 12 and 16. Proper spacing is maintained between adjacent rollers 8 by the cage 10 which likewise fits between the cone 4 and cup 6, but does not contact either one of them. The thrust rib 14 on the cup 6 projects inwardly partially across the large diameter end faces of the rollers 8 and has an inwardly presented wear surface against which those large diameter end faces bear. Similarly, the thrust rib 20 projects outwardly partially across the small diameter end faces of the rollers 8 and has a wear surface against which those small diameter end faces bear. Thus, the wear surfaces on the ribs 14 and 20 serve as an end abutments for the rollers 8 and help maintain the rollers 8 properly orientated between the raceways 12 and 16. Very little clearance exists between the wear surfaces on the thrust ribs 14 and 20 and the opposed end faces of the rollers 8 so that the axial play between the cone 4 and the cup 6 is limited.

When the bearing 2 is placed in thrust such that the thrust ribs 14 and 20 are urged away from each other the rollers 8 are seated tightly against the raceways 12 and 16, and the thrust load is transferred through those raceways and through the thrust rib 14. On the other hand, when the thrust load is applied such that the thrust ribs 14 and 20 are urged toward each other, the wear surfaces on the thrust ribs 14 and 20 bear against the end faces of the rollers 8 and the thrust is transmitted generally axially through the rollers 8. Thus, it is important that the thrust rib 20 be in some way fixed in position relative to the cone 4.

From the foregoing it is apparent that the thrust ribs 14 and 20 serve three purposes. First, they enable the bearing 2 to transmit thrust loads applied in either axial direction. Secondly, they provide additional roller alignment to the rollers 8 in the load zone when radial or a combination of radial and thrust loads are applied. Third, they keep the bearing 2 together or, in other words, unitize it.

The cone 4, the cup 6, and the rollers 8 are all made from a carburizing grade of steel which is substantially case-hardened by carburizing. This provides the foregoing components with a hard wear-resistant outer surface, yet leaves them with a tough core capable of withstanding high shock loads which are so prevalent in most bearing applications. Before the bearing 2 is assembled and the thrust rib 20 is installed on the cone 4, the carburized case layer is removed from the cone 4 at the slightly tapered end surface 18 thereon, and at the same time a chamfer 23 is formed along the outer edge of the surface 18. When the rib 20 is properly positioned on the cone 4, the cone chamfer 23 is disposed adjacent to the rib chamfer 21, and the two chamfers in combination form an outwardly opening V-shaped groove at the end of the cone 4.

The thrust rib 20, on the other hand, is made from steel having sufficiently high carbon content to enable it to respond satisfactorily to heat treatment of the type capable of producing localized hardening. Only the portion of the rib 20 constituting the wear surface against which the small diameter ends of the rollers 8 bear is hardened by such heat treatment. Preferably, the heat treatment is an induction hardening process. Along the remaining surfaces of the thrust rib 20, and particularly along the surfaces constituting its inside face and adjoining chamfer 21, the tough unhardened steel is exposed. Consequently, when the thrust rib 20 is installed over the tapered end surface 18 of the cone 4, the tough unhardened inner surface of the rib 20 will be in direct contact with the tough unhardened core of the cone 4. Also, the unhardened material of the rib 20 and cone 4 will be exposed at the chamfers 21 and 23 which form the V-shaped groove at the end of the cone 4.

The bearing 2 is assembled with a fixture into which the cup 6 is placed, followed by positioning of the cage 10 in the cup 6 and then allowing the rollers 8 to be loaded into the cage pockets. Then, while the rollers 8 are held in engagement with the cup raceway 12, the cone 4 with its thrust rib 20 detached is inserted into the cup 6. More specifically, the small diameter end of the cone 4 is introduced into the large diameter end of the cup 6, that is the end at which the large diameter ends of the rollers 8 are located. The cone 4 is advanced axially until its raceway 16 seats against the rollers 8, in which case the slightly tapered end surface 18 will project axially beyond the small diameter ends of the rollers 8. Then the ring-like thrust rib 20 is fitted over the end surface 18. In this connection, it should be noted that the thrust rib 20 and cone 4 are manufactured such that when the rib 20 seats against the tapered end surface 18 and the adjacent outer end faces of the rib 20 and cone 4 are flush the proper amount of operating clearance will exist beyond the ends of the rollers 8, or in other words the bearing 2 will be in proper adjustment. Subsequently, the thrust rib 20 is welded to the cone 4 at the groove formed by the two chamfers 21 and 23 so as to form a circular weld 24, and that weld 24 penetrates into the interface between the rib ring 20 and the cone surface 18.

To avoid introducing stresses into the weld 24 of the completed bearing 2, the small diameter end of the cone 4 is expanded within its elastic limit by applying an outwardly and radially directed force to the surface of the cone bore. This force expands the end of the cone 4 radially and induces a tensile pre-stress in the cone 4. Since the rib 20 snugly embraces the cone 4, the force is transferred to the rib 20 through the cone 4, and the rib 20 likewise experiences an expansion and the introduction of a tensile pre-stress into it.

The magnitude of the pre-stress is equal to or slightly greater than the amount of stress induced into the weld 24 as the metal of that weld cools and solidifies. Stated differently, the pre-stress is in a direction opposite that in which shrinkage is expected to occur and in an amount which equals or exceeds the expected shrinkage. The pre-stress is maintained as the rib 20 and the end of the cone 4 embraced thereby are welded together. The weld 24 is made along the groove formed by the chamfers 21 and 23 and penetrates into the interface between the rib ring 20 and cone surface 18. This weld 24 penetrates the core of the cone 4 from which the case layer has been removed and the rib 20 and is made exclusively in the tough unhardened metal of the cone surface 18 and the rib ring 20 so as to form a strong weld. When the weld metal solidifies and cools still further to the normal temperature of the bearing 2 the weld metal will tend to shrink. This shrinkage is, of course, resisted by the adjacent metal of both the cone 4 and rib 20 and as a result the metal in the weld 24 remains highly stressed in tension. However, the rib 20 and the end of the cone 4 on which the weld 24 is made are also highly stressed in tension due to the pre-stress created by the expansion thereof. Indeed, the stress within the weld 24 ideally equals the pre-stress in the rib 20 and cone 4.

Once the pre-stress in the cone 4 and thrust rib 20 are removed the cone 4 and rib 20 substantially recover their original shape. Of course, as the cone 4 and rib 20 contract so does the weld 24 and the stress initially induced in it is minimized. In other words, since the pre-stress in the cone 4 and rib 20 and the stress created in the weld 24 upon cooling are substantially equal, the contraction of the cone 4 and rib 20 by an amount necessary to bring them into a condition of substantially no stress will likewise bring the weld 24 into a condition of substantially no stress.

In order to expand the small diameter end of the cone 4 and the encircling thrust rib 20, the assembled but unwelded bearing 2 is placed in a welding fixture 30 including a spindle 32 which is journaled in a bearing 34 set into a base 36 (FIG. 1). The spindle 32 projects below the base 36 where it is revolved by a suitable drive mechanism (not shown). Above the bearing 34 the spindle 32 is provided with a flange 38 which merges into a short cylindrical stud 40 having an axially extending threaded bore 42 therein. The flange 38 forms a right-angle arbor seat 44 at the lower end of the stud 40.

Fitted over the stud 40 and against the seat 44 is an arbor 50 having an annular base 52 and integrally formed arcuate segments 54 (FIG. 3) which project upwardly and are arranged to form an annular or sleeve-like projection from the base 52. The segments 54 are separated by slots 56 so that each arcuate segment 54 may be urged outwardly without encountering significant resistance from adjacent segments 54. Near their upper ends the inwardly presented surfaces of the arcuate segments 54 are beveled outwardly so as to form a generally continuous frustoconical surface 58 around the interior of the arbor 50. The outwardly presented surfaces of the segments 54, on the other hand, form a cylindrical exterior surface 60 on the arbor 50, and that surface is sized to slide into the bore of the cone 4 when the segments 54 are not expanded. At its lower end the cylindrical exterior surface 60 merges into a right-angle positioning shoulder 62, and that shoulder serves to axially position the bearing 2 on the arbor 50. The distance from the shoulder 62 to the upper or free ends of the arcuate segments 54 is approximately equal to the axial dimension of the cone 4 (FIG. 1).

The hollow interior of the upper portion of the arbor 50 receives an expander 70 (FIGS. 1 and 2) having a frustoconical exterior surface 72, the taper of which matches the taper of the frustoconical surface 58 on the interior of the arbor 50. Indeed, the frustoconical surface 72 engages the complementary frustoconical surface 58 so that when the expander 70 is forced downwardly into the arbor 50, it drives the upper ends of the arcuate segments 54 outwardly. The expander 70 has a downwardly opening bore 74 which is sized to receive the portion of the spindle stud 40 projecting beyond the annular base 52 of the arbor 50.

The expander 70 is forced downwardly into the arbor 50 by means of a bolt 76 which extends axially through the expander 70 and threads into the bore 42 of the spindle stud 40. The head of the bolt 76 bears against the upper surface of the expander 70. A hydraulic cylinder or any other suitable device may be used in lieu of the bolt 76.

In use, the welding fixture 30 holds the assembled but unwelded bearing 2 so that the small diameter end of the cone 4 and the embracing thrust rib 20 can be welded together to unitize the bearing. In particular, the cone 4 of the assembled but unwelded bearing is passed downwardly over the cylindrical exterior surface 60 until its large diameter end rests upon the positioning shoulder 62. In this position the cylindrical exterior surface 60 will extend generally up to the small diameter end of the cone 4, and the frustoconical surface 58 at the interior of arbor 50 will be presented directly inwardly from the slightly tapered end surface 18 on the cone 4 and the thrust rib 20 encircling that surface. Then the bolt 76 is tightened to force the expander 70 further into the arbor 50. As the frustoconical surface 72 of the expander 70 moves across the frustoconical surface 58 of the arbor 50, the arcuate segments 54 will move radially outwardly. Since the segments 54 engage the inner or bore-forming surface of the cone 4, the outwardly directed force created by the movement of the expander 70 is applied to the small diameter end of the cone 4 and indeed expands the cone 4 as well as the thrust rib 20 embracing it. The cone 4 of course, experiences its greatest amount of expansion at its small diameter end and particularly at the surface 18 embraced by the thrust rib 20. Of course, as the cone 4 and rib 20 expand radially tensile stresses develop in them.

The bolt 76 is tightened until the tensile stress at the juncture of the cone 4 and rib 20 equals or slightly exceeds the tensile forces which will develop in the weld 24 as it solidifies and cools. In lieu of the bolt 76, the expander 70 may be advanced by other suitable devices such as a hydraulic cylinder.

Once the pre-stress is applied to the small diameter end of the cone 4 and the thrust rib 20 positioned around that end, the welding head of an electron beam or laser beam welder is placed over the upwardly presented end surfaces on the cone 4 and rib 20 and aligned with the groove formed by the two chamfers 21 and 23. Then the welder is energized and the spindle 32 of the fixture 30 is rotated so that a circular weld 24 (FIGS. 2 and 4) is formed at the interface of the end surface 18 on the cone 4 and the abutting inner face of the thrust rib 20. This weld 24, of course, fuses the rib 20 and small diameter end of the cone 4 together.

As the molten metal in the weld area solidifies into the circular weld 24 and subsequently cools thereafter tensile stresses will set up in the weld 24, and these stresses will be equal to or slightly less than the pre-stress created in the small diameter end of the cone 4 and the thrust rib 20 positioned around that end.

Finally, after the weld 24 has solidified the expander 70 is retracted sufficiently to relieve the pre-stress in the cone 4 and rib 20 and the bearing 2 is then removed from the fixture 30. Of course, as the expander 70 is retracted, the small diameter end of the cone 4 and the thrust rib 20 contract, and so does the weld 24. Since the weld 24 is formed from substantially the same metal as the cone 4 and rib 20 and is likewise initially under a substantially equivalent tensile stress, it contracts along with the cone 4 and rib 20 and will reach a condition of minimal stress when the cone 4 and rib 20 attain substantially their original diameters. In other words, when the cone 4 and the rib 20 reach a condition of minimum stress, the weld 24 will likewise reach a condition of minimum stress. This enables the cone 4 and rib 20 to assume substantially their initial diameters once the pre-stress is removed, and the cooled weld 24 in no way affects or otherwise distorts the initial or machined diameter of the cone 4 nor does it alter the taper of its raceway 16. Thus, the process does not distort the shape of the cone 4.

One may calculate the stress induced by the weld 24 merely by welding the rib 20 to the cone 4 under conditions which allow the weld 24 to contract the cone 4, that is without the welding fixture 30, and then measuring the contraction of the cone 4 and rib 20. The most practical place to make such measurements is at the rib end of the bore extending through the cone 4. The amount of expansion imparted by the fixture 30 is correct when the rib end of the cone bore, after the weld 24 has cooled and the bearing 2 is removed from the fixture 30, shows no growth from overstressing and no shrinkage from understressing.

The absence of substantial internal stresses in the weld 24 retards the formation of cracks in the weld 24 and the subsequent propagation of those cracks to the cone 4 when the cone 4 is subjected to fatigue stress. This, in turn, enables the bearing 2 to operate much longer without developing fatigue cracks in the rib 20 and the cone 4, and consequently the weld 24 does not shorten the life of the bearing 2.

While the foregoing disclosure has been devoted primarily to a process for welding a rib ring to the cone of a tapered roller bearing, the process may also be utilized to weld an initially separate thrust rib or like components in other types of bearings, such as straight roller bearings.

This invention is intended to cover all changes and modifications of the example of the invention herein chosen for purposes of the disclosure which do not constitute departures from the spirit and scope of the invention.

What is claimed is:

1. A method of welding circular bearing components together; said method comprising expanding the bearing components, welding the components together while they are expanded, and allowing the bearing components to shrink back toward their initial size after the metal of the weld has solidified.

2. A method according to claim 1 wherein the bearing components are expanded by the application of force thereto so as to pre-stress the components, and wherein the pre-stress remains within the elastic limits of the components so that the components will shrink back to substantially their initial size when the force is removed.

3. A method according to claim 2 wherein the pre-stress is equal to at least approximately the stress induced in the metal of the weld area after that metal has solidified and cooled significantly whereby when the pre-stress is removed the weld area will shrink so as to be substantially relieved of stress.

4. A method according to claim 3 wherein at least one of the bearing components is case hardened; and wherein the process further comprises removing the hardened case in the vicinity of the weld before the weld is made.

5. A method according to claim 3 wherein the bearing components are annular in shape; and wherein the components are expanded by applying a radially and outwardly directed force to their inwardly presented surfaces.

6. A method according to claim 3 wherein the bearing components are annular in shape; wherein one bearing component embraces the other bearing component; and wherein the components are expanded by applying an outwardly directed force to the inwardly presented surface of the embraced component, whereby the force is transmitted through the embraced component to the embracing component and both components are pre-stressed simultaneously.

7. A method according to claim 5 wherein the radially and outwardly directed force is derived by moving a pair of frustoconical surfaces axially with respect to each other, the outer surface being segmented so that individual segments thereof are not significantly restrained by adjoining segments.

8. A method according to claim 3 wherein one component is a race of a tapered roller bearing and the other component is a thrust rib.

9. A method according to claim 6 wherein the embraced component is a cone of a tapered roller bearing and the embracing component is a thrust rib at one end of the cone.

10. A method for unitizing a bearing including first and second races having opposed raceways and rolling elements interposed between and engaged with the raceways, each race further having a thrust rib at least at one end of its raceway and at least the thrust rib on the first race being initially detached therefrom to enable insertion of the rolling elements between the raceways, said process comprising installing the rolling elements between the raceways, positioning the initially detached thrust rib against the first race after the rolling elements have been installed between the raceways, expanding both the first race and the thrust rib positioned against it within their elastic limits at the area of contact between them so that both the first race and the thrust rib are pre-stressed, welding the thrust rib and the first race together while they are pre-stressed, and thereafter relieving the pre-stress.

11. A method according to claim 2 wherein the pre-stress in the first race and thrust rib is equal at least approximately to the stress induced in the metal of the weld area after that metal has solidified and cooled significantly, whereby when the pre-stress is removed the weld area will shrink so as to be substantially relieved of stress.

12. A method according to claim 11 wherein the first and second races are the cone and cup, respectively, of a tapered roller bearing; wherein the thrust rib on the cup is formed integral thereto at the large diameter end of the cup raceway; and wherein the initially detached rib is welded to the cone so that the rib is positioned adjacent the small diameter end of the cone raceway.

13. A method according to claim 12 wherein the cone thrust rib embraces the end of the cone; and wherein the cone and embracing thrust rib are expanded by exerting an outwardly directed force on the cone at the portion thereof embraced by the thrust rib so that cone and embracing thrust rib are expanded simultaneously.

14. A method according to claim 1 wherein the bearing components are annular, and are expanded by applying force thereto so as to impart a circumferential tensile stress, the tensile stress being within the elastic limits of the materials from which the bearing components are formed.

* * * * *